L. E. BAKER.
INDICATING SCALE.
APPLICATION FILED AUG. 30, 1915.
1,186,965.
Patented June 13, 1916.
3 SHEETS—SHEET 3.
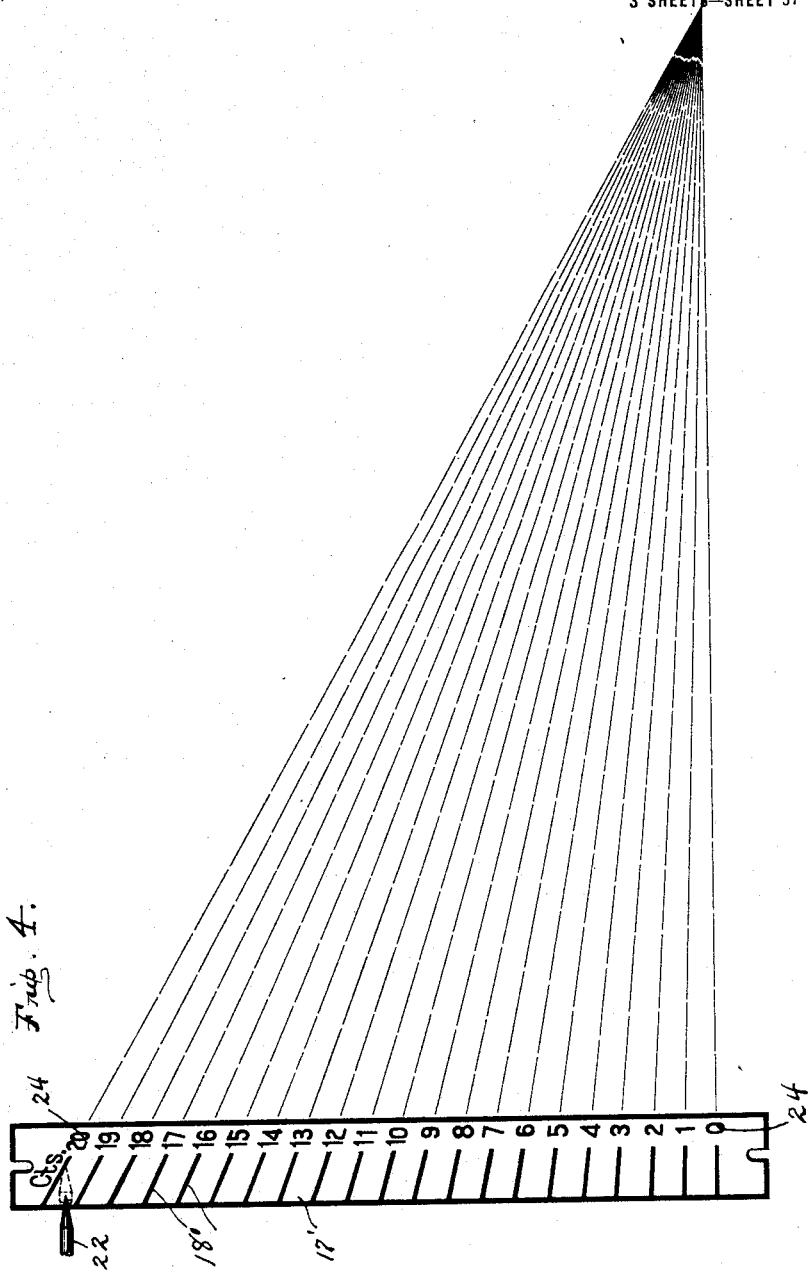

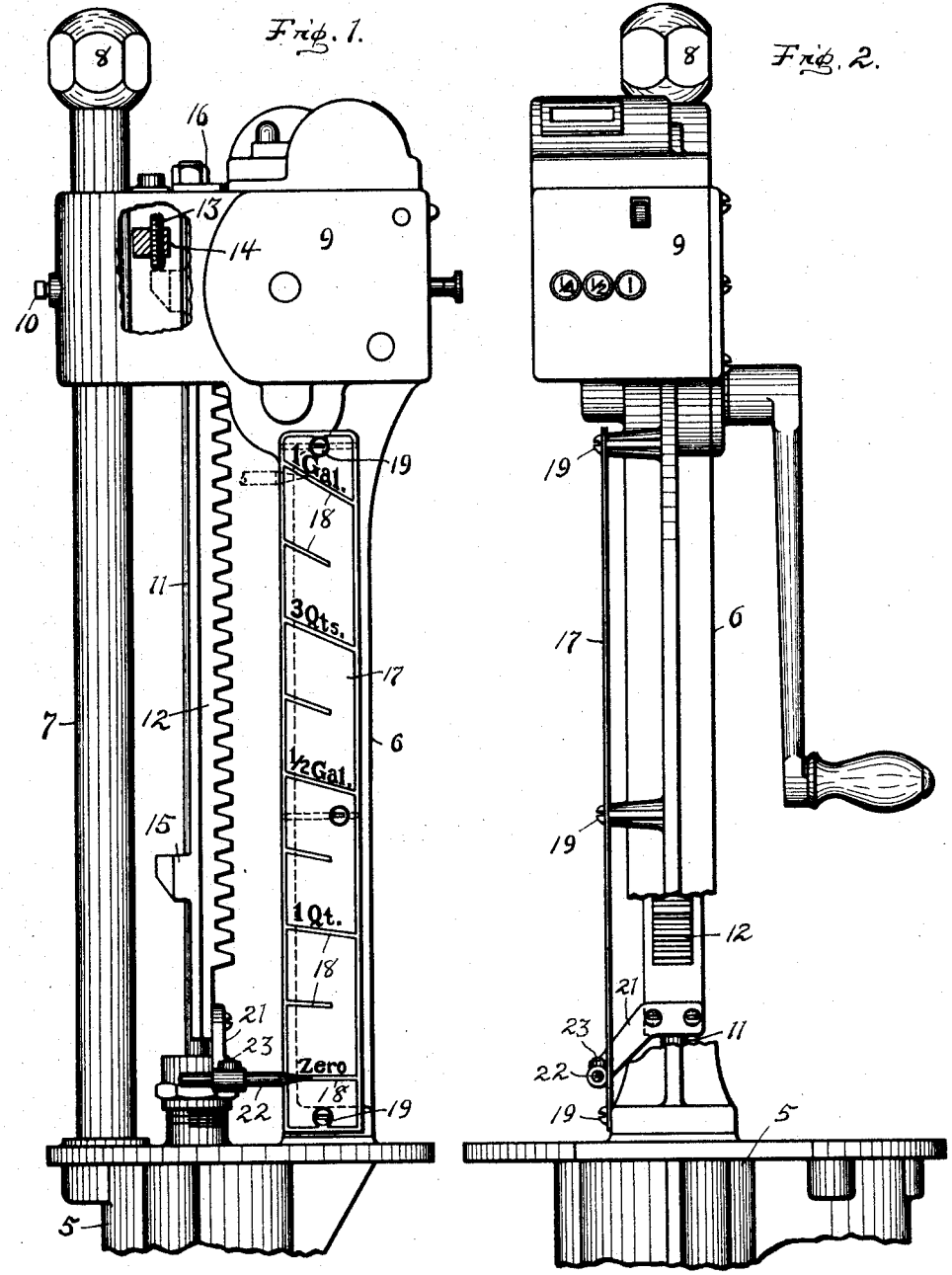

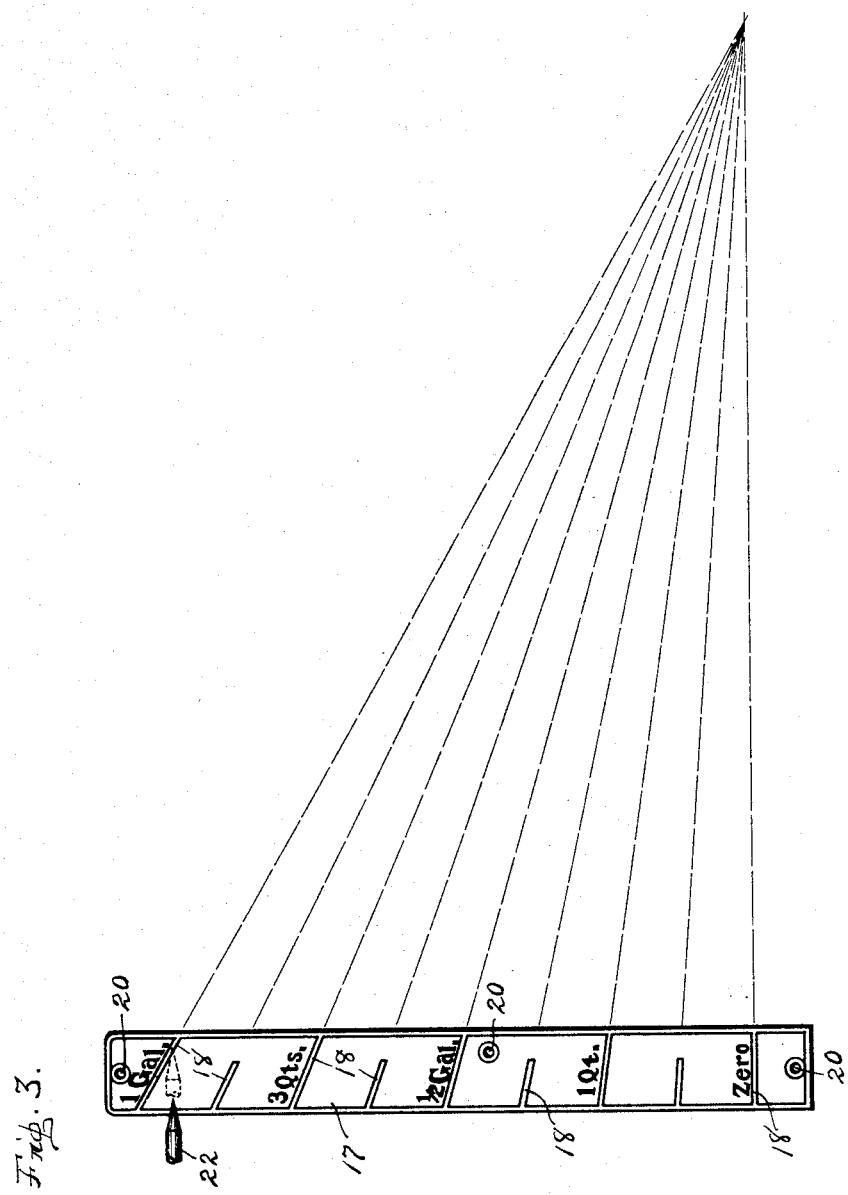

UNITED STATES PATENT OFFICE.

LINNAEUS E. BAKER, OF FORT WAYNE, INDIANA, ASSIGNOR TO WAYNE OIL TANK & PUMP CO., A CORPORATION OF INDIANA.

INDICATING-SCALE.

1,186,965.

Specification of Letters Patent.

Patented June 13, 1916.

Application filed August 30, 1915. Serial No. 47,970.

*To all whom it may concern:*

Be it known that I, LINNAEUS E. BAKER, a citizen of the United States of America, and resident of Fort Wayne, in the county of Allen and State of Indiana, have invented certain new and useful Improvements in Indicating-Scales, of which the following is a specification.

This invention relates to improvements in indicators for measuring pumps and the object thereof is to provide means in connection with a measuring pump for indicating various stages of the complete discharge stroke of the pump, preferably equal fractional portions thereof, and to include adjustments for the several parts to enable the operator to set the device so as to compensate for inaccuracy in manufacture and wear.

The invention applies particularly to pumps of the reciprocating type for dispensing liquids, and wherein the pump cylinder and the length of the stroke of its plunger are proportioned so as to effect the discharge of a definite unit quantity of liquid upon each one complete cycle of movement. The present purpose contemplates means of adjustment for the pump to more or less limit its stroke to the point where the discharge therefrom, upon each complete stroke thereof, will be of a definite unit quantity, and also, the intent is to provide a scale and pointer with suitable adjustments so that the same may be readily shifted to accurate working positions compensatingly as the adjustments of the length of the stroke of the pump become necessary to insure an accurate quantitative discharge.

The object of the invention is accomplished by the construction illustrated in the accompanying drawings in which:

Figure 1 is an elevation of a pumping mechanism showing a front view of the invention in connection therewith; Fig. 2 is a view of Fig. 1 in a plane at right angles thereto; Fig. 3 is a front view of the scale plate and a portion of the adjustable index, and showing also a series of lines drawn from a point that lies in the horizontal plane of the lowermost scale line on the plate, the lines being radially disposed and intersecting and presenting relatively different angles to the plate; and Fig. 4 is a modification of Fig. 3.

Similar reference characters indicate corresponding parts throughout the several views and referring now to the same: (5) is a pump proper of the reciprocating piston type; (6) is a standard mounted upon and supported by the pump proper; and (7) is a pipe connected at its lower end with the pump and closed at its top by a cap (8) and serves as an expansion chamber for the pump as well as a partial support for the head (9) on the standard. The pipe extends through the head and is rigidly secured in connection therewith by means of a set-screw (10). The head is for the purpose of containing the operating mechanism for the pump which is not disclosed herein inasmuch as any of the well known operating mechanisms for driving the pump may be employed in conjunction with the present invention.

The pump has a vertically reciprocating pump-rod (11) that extends through the head (9), and has fixed thereon a rack-bar (12) adapted to be actuated by such operating mechanism as above referred to. An adjustable stop (13) consisting of a screw located in a fixed lug (14) and located in the path of a projection (15) that extends from the rack-bar (12) serves to limit the upward stroke of the rack-bar and pump-rod connected therewith, and a nut (16) having screw-threaded relation with the upper end of the pump-rod and being adapted to come into contact with the upper face of the head (9) serves to limit the downward stroke of the pump-rod.

A graduated scale-plate (17) having graduation marks (18) thereon, arranged in a particular manner, is mounted in fixed relation with the standard and in a vertical plane parallel with the pump-rod. The plate (17) is secured to the standard by means of screws (19), the holes (20) in the plate for the reception of the screws being made of sufficient diameter as to admit of slight vertical adjustment of the plate.

A bracket (21) extends outwardly from the rack to which it is securely attached, and in the outer end of the bracket is adjustably secured an index (22) arranged to be horizontally shifted in the bracket. A screw (23) in the bracket serves to bind the index in its various adjusted positions. The pointed end of the index extends immediately in front of the plate and moves vertically with the rack-bar as the pump is operated so that the pointed end will pass over the various graduation marks on the plate during the operation and thereby indicate the various stages of the stroke of the pump.

In the manufacture of apparatus of the kind herein involved it has been found that owing to variations in the internal diameter of the tubings that form the pump cylinders, and also owing to wear, incidental to subsequent use of the pump, a corresponding variation in the discharge of the pump proper will occur, and therefore it is necessary to make provision to adjustably alter the stroke of the pump as well as to provide adjustment for the indicating mechanism to compensate for such variations as occur. To attain an accurate quantitative discharge of the pump it is essential that the stroke of the pump shall be so proportioned as to deliver upon each cycle of its operation a definite unit quantity; and to indicate the various fractional stages of the pump during its discharge stroke in accurate proportion, it is essential that the indicating scale be such that its length from one extreme to the other will be traversed by the index correspondingly and also proportionately throughout the various fractional stages of the operation of the pump. To meet the above contingencies the horizontally adjustable index (22) is arranged to move with the rack-bar and pump-rod attached thereto and a scale-plate is fixed upon the standard in parallel relation with the pump-rod and positioned so that the index will be moved thereover immediately in front of the scale during the cycle of the pump and thus indicate the various stages in fractional parts throughout its movement. In order to make the scale conform in length to the various lengths of stroke to which the pump may be adjusted, the graduation marks (18) have been particularly arranged so that when the stroke of the pump has been, through its adjustments, limited to the length of stroke required for the discharge of a definite unit quantity of liquid, the index through its adjustment may be made to traverse the scale and terminate in its movement at the graduation lines respectively at the upper and lower ends of the scale. Thus, although the length of the stroke of the pump may be altered, the point of the index carried by the rack moved with the pump-rod may be adjustably shifted so as to register precisely with the graduation lines and thereby indicate correctly the various stages throughout the complete stroke of the pump.

In operating the invention the rack-bar attached to the pump-rod is moved to its lowermost position, at which stage the point of the index (22) attached thereto extends in the same horizontal plane as the lowermost graduation line (18) which is designated "Zero". The pump is then operated in the customary way, and the set-screw (13) is manipulated so that the upward or discharge stroke of the pump is properly limited at that stage which results in the discharge from the pump of liquid in the intended unit quantity. While the projection (15) is held in contact with the screw (13) after the same has been properly adjusted, the index (22) is shifted horizontally until its pointed end intersects the uppermost of the graduation lines (18) on the scale, designated "1 Gal." The index is then secured in its adjusted position by means of the set-screw (23). The apparatus is then in readiness for operation.

By forming the graduation lines (18) so that they extend laterally on the scale commencing at one end thereof with the line "Zero" extending in a horizontal plane and with the other graduation lines arranged in successive order with increased inclination, the point of the index will intersect the various graduation lines correspondingly at the proper stage of the stroke of the pump and thus will be indicated by the movement of the index upon the scale the full stroke of the pump as well as the fractional portions thereof in true proportion.

As shown in Figs. 1 and 3 the graduation lines are designated by terms indicative of the quantity of fluid discharged by the pump at each full stroke and its fractional parts, the terms being those ordinarily used for liquid measure.

In Fig. 4 is shown a scale-plate (17′) having arranged thereon a series of graduation lines (18′) and also a corresponding series of characters (24). In this instance as in the former, the lowermost graduation line (18′) is made horizontal and the succeeding lines are arranged in successive order with increasing inclination. The corresponding series of numerals (which are not intended as reference numerals) designate the monetary value of the liquid discharged by the pump throughout the corresponding stages of its stroke. Thus the invention may be applied to the pump so that the index will indicate upon the scale by its position either the various quantities of fluid discharged by the pump at any of its stages or the monetary value of such quantities at the corresponding stages.

What I claim is:—

1. In apparatus of the class described, a pump proper having mechanism in connection therewith for actuating the same; means for regulating the extent of the stroke of the pump; a laterally adjustable index fixed to and movable with the pump mechanism; and a stationary scale-plate having a series of graduation lines thereon arranged in successive order and respectively with increasing inclination from one end to the other and having also distinguishing characters applied to the various graduation lines.

2. In apparatus of the class described, a pump; a mechanism for actuating the pump; a horizontally adjustable index arranged in connection and movable with the actuating mechanism; and a scale-plate in fixed relation with the pump and in position to be traversed by the index, said plate having graduation lines thereon arranged in radial relation with each other.

3. In combination with a pumping mechanism, a laterally adjustable index in connection with the actuating mechanism of the pump and adapted to be moved therewith, and a stationary scale-plate positioned to be traversed by the index and having thereon a series of laterally disposed graduation lines suitably designated and arranged radially relative to each other.

4. In combination with a pump having actuating mechanism therefor, an index adjustably secured to and adapted to be moved by the actuating mechanism, means for laterally adjusting the index, and a stationary scale-plate positioned to be traversed by the index and bearing a series of laterally disposed graduation lines arranged respectively in radial relation with each other.

5. In combination with a reciprocating pumping mechanism having a movable index thereon, a stationary scale-plate positioned to be traversed by the index and bearing a series of radially disposed graduation lines; and means for adjustably shifting the index laterally relative to the scale-plate.

In testimony whereof I affix my signature, in presence of two witnesses.

LINNAEUS E. BAKER.

Witnesses:
A. D. HEATH,
W. G. BURNS.

Copies of this patent may be obtained for five cents each, by addressing the "Commissioner of Patents. Washington, D. C."